United States Patent [19]

Davis

[11] 4,261,961

[45] Apr. 14, 1981

[54] PROCESS FOR THE EXTRACTION OF POTASSIUM FROM AQUEOUS ALKALINE SOLUTION

[75] Inventor: Robert E. Davis, Oklahoma City, Okla.

[73] Assignee: Kerr-McGee Chemical Corporation, Oklahoma City, Okla.

[21] Appl. No.: 98,799

[22] Filed: Nov. 30, 1979

[51] Int. Cl.³ .............................................. B01J 1/04
[52] U.S. Cl. .................................... 423/181; 210/681
[58] Field of Search .............. 423/181, 283; 210/38 R

[56] References Cited

U.S. PATENT DOCUMENTS 2,969,275  1/1961  Garrett .................................. 423/283
3,111,383  11/1963  Garrett et al. ........................ 423/283

FOREIGN PATENT DOCUMENTS 910541  11/1962  United Kingdom ...................... 423/283

Primary Examiner—O. R. Vertiz
Assistant Examiner—Wayne A. Langel
Attorney, Agent, or Firm—William G. Addison

[57] ABSTRACT

A process for liquid-liquid ion exchange of alkali metal ions. An alkaline aqueous phase containing potassium ions together with other alkali metal ions is contacted with an organic phase containing a polyol-boron-alkali metal complex. The organic phase preferentially extracts potassium values from the aqueous phase. The potassium values are separated from the polyol-boron-alkali metal complex by, for example, stripping with dilute sulfuric acid.

8 Claims, No Drawings

PROCESS FOR THE EXTRACTION OF POTASSIUM FROM AQUEOUS ALKALINE SOLUTION

BACKGROUND OF THE INVENTION

1. Field of the Invention

This invention relates to liquid-liquid ion exchange of alkali metal ions. More specifically, the invention provides a process whereby potassium is recovered from an aqueous phase by ion exchange with a polyol-boron-alkali metal complex.

2. Description of the Prior Art

In the past, borax and other boron containing materials as well as salts of the alkali metals have been recovered from alkaline brine solutions by evaporation or by cooling the brine so that the salt will crystallize from the solution.

More recently, solvent extraction processes such as those disclosed in U.S. Pat. Nos. 2,969,275 and 3,111,383 have been developed to recover boron values. When such solvent extraction processes are employed to recover boron values from brine, an alkali metal ion, such as sodium or potassium also is co-extracted along with the boron values. Such co-extraction from alkaline brines is desirable as long as a market exists for salts of the recovered mixed metallic ions. Since potassium is of greater commercial value than sodium, it would be desirable in such boron extraction processes to exchange at least a portion of the sodium values contained therein for potassium values.

Other processes for the recovery of boron or alkali metal salts from alkaline brines are disclosed in, for example: U.S. Pat. Nos. 2,726,138; 2,969,275; 3,179,503; 3,424,563; 3,433,604; 3,493,3493,582,290; 3,598,547; 3,598,548; 3,741,731; and 3,812,238.

SUMMARY OF THE INVENTION

It now has been discovered that the polyol-boron-alkali metal complex formed in a boron extraction process can be utilized as an ion exchange agent for the selective extraction of potassium. In accordance with he present invention, an alkaline aqueous phase containing potassium values together with other alkali metal values is contacted with an organic solvent containing a polyol-boron-mixed alkali metal complex whereby potassium values are preferentially extracted from the aqueous phase into the organic phase.

DESCRIPTION OF THE PREFERRED EMBODIMENT

It is known that boron can be preferentially extracted from an alkaline brine containing boron and alkali metal ions by contacting the brine with an aromatic polyol in an organic solvent. Also, it is known that in such processes, an alkali metal ion, such as for example, sodium or potassium is coextracted with the boron values in the form of a polyol-boron-mixed alkali metal complex. The discovery now has been made that such a complex can be used as an ion exchange agent for the preferential extraction of potassium from brines containing potassium and other alkali metal ions.

The term "polyol" as used herein is more fully described in U.S. Pat. Nos. 2,969,275 and 3,111,838, the disclosures of which are incorporated herein by reference. Examples of preferred polyols include 1,2-diphenylglycol; 4-iso-octyl- 6-chloro-saligenin; 4,6-dichlorosaligenin; 4-nonyl-6chloro-saligenin and the like.

The present invention contemplates the use of an organic diluent containing a polyol-boron-mixed alkali metal complex, as described in the referenced U.S. Patents, to preferentially extract potassium ions from brines containing potassium and other alkali metal ions.

The present invention is applicable to any alkaline brine containing potassium ions. It has been found that the potassium and sodium distribution between the organic and aqueous phases for the extractant can be related by the equation:

$$\frac{(K^+)_o}{(K^+)_a} = 58 \left( \frac{(Na^+)_o}{(Na^+)_a} \right)^{1.418}$$

wherein the o and a subscripts refer to the organic and aqueous phases, respectively, and the parentheses indicate ionic concentrations in consistent units.

An example of a brine of commercial importance is the end liquor from a sulfate of potash plant, such as is found at Searles Lake, Calif. The end liquor stream contains approximately 18 percent by weight potassium chloride, 9 percent by weight sodium chloride and lesser amounts of other salts.

Other sources of applicable potassium containing brines include brine produced by (i) dissolving potash, (ii) mother liquor from a pentahydrate borax crystallization process, such as is found at Searles Lake, Calif. and the like.

As will be appreciated by those skilled in the art, the organic to aqueous ratio utilized will be a function of may variables. For example, the ratio will depend upon the amount of polyol-boron-alkali metal complex which contains ions other than potassium ions, as well as the amount of potassium contained in the brine. When it is desired to exchange substantially all the sodium values conained in the polyol-boron-alkali metal complex for potassium values, the ratio of organic to aqueous should be such as to provide at least the stoichiometric amount of potassium in the aqueous phase that is required to exchange all the sodium values in the organic phase. Generally, the organic to aqueous ratio is within the range of from about 1:10 to about 10:1. In a process wherein the organic phase contains about 10 percent by weight of polyol-boron-mixed alkali metal complex in which the mixed alkali metal ions consist essentially of about a 1 to 1 ratio of sodium to potassium ions and the aqueous brine contains about 18 percent by weight of potassium chloride, an effective organic to aqueous ratio has been found to be within the range of from about 1:2 to about 2:1. The extracted potassium values can be separated from the polyol-boron-potassium complex by, for example, treating the complex with a dilute mineral acid, with sulfuric acid being preferred. The complex decomposes upon contact with the dilute mineral acid and the boron values and associated potassium ions and other remaining alkali metal cations pass into the aqueous acidic phase. The organic can be separated and employed to form additional polyol-boron-alkali metal complex extractant. The aqueous phase containing boric acid and salts of the mineral acid may be sent to a boric acid recovery station where boric acid is recovered by an evaporation and crystallization cycle. When sulfuric acid is the mineral acid, sufficient water can be evaporated from the aqueous phase to crystallize boric acid at a temperature of about 35 degrees C. The quantity of water evaporated is controlled to maintain the sulfates in the solution. After removal of the solid boric acid, the solutin is heated to a high temperature to evaporate more water. Because the solubility of boric acid increases more rapidly with an increase in temperature than does the solubility of potassium sulfate or other alkali metal sulfates, the sulfates crystallize out and the remaining boric acid remains in solution. The potassium sulfate and other sulfates then may be separated from the solution by filtration, centrifugation or the like, in a substantially pure form.

To illustrate the present invention, and not by way of limitation, the following Examples are set forth.

EXAMPLE I

A 100 gram sample of an extractant consisting of about 90 percent by weight kerosene and 10 percent by weight polyol (4-iso-octyl-6-chloro-saligenin)-boron-mixed alkali metal complex is prepared by contacting a brine containing boron, sodium and potassium values with the polyol in a kerosene diluent. A 50 gram sample of the extractant is stripped with dilute sulfuric acid solution and the striped solution analyzed. The alkali metal content is determined to be equivalent to 0.339 grams potassium sulfate and 0.331 grams sodium sulfate. The balance of the extractant is intimately contacted with a solution comprising one third the volume of the extractant and which contains about 2 percent by weight of potassium chloride and 0.05 percent by weight of sodium carbonate. This provides a ration of about 1.3 moles of potassium in the solution per mole of sodium in the extractant.

The extractant then is separated from the aqueous phase and stripped with a dilute sulfuric acid solution. The strip solution is analyzed for potassium and sodium content and it is determined that the strip solution contains 0.606 grams of potassium sulfate and 0.055 grams of sodium sulfate. Approximately 83 percent of the sodium values in the extractant are replaced with potassium. This clearly demonstrates the exchange of sodium values for potassium values by the organic extractant phase to provide a potassium-rich organic extractant.

EXAMPLE II

The following tests were performed to determine the "separation factor" for the exchange of sodium for potassium values between a brine and an extractant. The "separation factor" provides a means of determining the effectiveness of the ion exchange process. The "separation factor" is defined as:

$$S.F. = \frac{[K]/[Na] \text{ in the extractant after exchange}}{[K]/[Na] \text{ in the brine after exchange}}$$

The extractant is obtained from a commercial boron solvent extraction process and comprises about 80 percent by weight kerosene, 10 percent by weight polyol (4-iso-octyl-6-chloro-saligenin)-boron-mixed alkali metal complex and 10 percent by weight non-reactive phenolics (degradation products of the polyol). The mixed alkali metal content of the complex is determined to be 0.172 percent by weight sodium and 0.272 percent by weight potassium.

The brine is an alkaline solution having a pH of about 9 to 10 having the composition set forth in Table I, below.

TABLE I

| Brine Constituent | Percent by Weight |
|---|---|
| KCl | 18 |
| NaCl | 9 |
| $Na_2SO_4$ | 3.2 |
| $Na_2CO_3$ | 1.1 |
| $Na_2B_4O_7$ | 1 |

The tests are conducted by contacting a sample of the brine with extractant for a two-minute period. As shown in Table II, below, eight tests are conducted. The tests are conducted utilizing various organic to aqueous ratios and various brine concentrations to determine their effect on the separation factor (S.F.). The dilution of the brine is effected by the addition of well water which contains about 1 percent by weight of sodium chloride and no appreciable amount of potassium. A larger value of S.F. indicates more potassium from the brine is exchanged into the loaded extractant. The results of these teste are set forth in Table II, below.

TABLE II

Determination of Separation Factor For Batch Extraction

| Test No. | Dilution Ratio % Water/% Brine | Organic/Aqueous Ratio | Separation Factor |
|---|---|---|---|
| 1 | 0/100 | 1/1 | 7.29 |
| 2 | 75/25 | 1/1 | 10.06 |
| 3 | 50/50 | 1/1 | 8.89 |
| 4 | 25/75 | 1/1 | 8.30 |
| 5 | 0/100 | 2/1 | 6.93 |
| 6 | 75/25 | 2/1 | 8.90 |
| 7 | 0/100 | 3/1 | 6.47 |
| 8 | 75/25 | 3/1 | 8.88 |

The tests show that with this brine and extractant, optimum separation is obtained with about 75 per cent dilution of the brine and an organic to aqueous ratio of 1:1 as demonstrated by the high separation fractor.

EXAMPLE III

To determine the effect of multiple stages on the separation fractor, a three stage countercurrent extraction is performed.

The extractant is obtained from a commerical boron solvent extraction process and comprises about 80 percent by weight kerosene, 10 percent by weight polyol (4-iso-octyl-6-chloro-saligenin)-boron-mixed alkali metal complex and 10 percent by weight non-reactive phenolic (degradation products of the polyol). The mixed alkali metal content of the complex is determined to be 0.172 percent by weight sodium and 0.272 percent by weight potassium.

The aqueous is an alkaline solution in which the alkali metal content is determined to be 7.26 percent by weight sodium and 7.48 percent by weight potassium.

The three stage extraction process is operated for a sufficient period of time to achieve steady state operation. Then, after the extraction is completed in each stage, samples are withdrawn from each stage and analyzed. The results of these analyses and the calculated separation factors are set forth in Table III, below.

TABLE III

Determination of Separation Factor
For Multiple Stage Extractions

| Stage | Organic Phase, Wt. % $Na^+$ | $K^+$ | Aqueous Phase, Wt. % $Na^+$ | $K^+$ | Separation Factor |
|---|---|---|---|---|---|
| 1 | 0.090 | 0.438 | 2.53 | 1.01 | 12.1 |
| 2 | 0.129 | 0.350 | 2.72 | 0.54 | 13.7 |
| 3 | 0.156 | 0.287 | 2.79 | 0.36 | 14.2 |

The results clearly demonstrate that multiple stage extraction can be used to improve the extraction efficiency and hence the recovery of potassium ions from the alkaline solution by the polyol-boron-alkali metal complex.

While the present invention has been described with respect to what at present is considered to be the preferred embodiment thereof, it is to be understood that changes or modifications can be made in the process without departing from the spirit or scope of the invention as defined by the following claims.

What is claimed is:

1. A process for extracting potassium ions from an alkaline solution which comprises:
   providing an organic extractant comprising a polyol-boron-alkali metal complex in which at least a portion of the alkali metal ions are not potassium;
   contacting said alkaline solution containing potassium ions with said organic extractant to exchange potassium ions for at least a portion of the alkali metal ions other than potassium ions contained in said polyol-boron-alkali metal complex and displace said exchanged alkali metal ions from said complex into said alkaline solution; and
   separating the polyol-boron-potassium complex so produced from said alkaline solution.

2. The process of claim 1 whrein the alkali metal ions other than potassium ions in said polyol-boron-alkali metal complex comprise sodium ions.

3. The process of claim 1 defined further to include the step of:
   contacting said separated polyol-boron-potassium complex with dilute sulfuric acid to strip said potassium ions from said complex.

4. The process of claim 1 wherein contacting the alkaline solution with the polyol-boron-alkali metal complex is further defined as:
   contacting said polyol-boron-alkali metal complex with said alkaline solution in a ratio of from about 10:1 to about 1:10.

5. The process of claim wherein contacting the alkaline solution with the polyol-boron-alkali metal complex is further defined as:
   contacting said polyol-boron-alkali metal complex with said alkaline solution in a ratio of from about 2:1 to about 1:2.

6. The process of claim 1 wherein said polyol in said polyol-boron-alkali metal complex is 4-iso-octyl-6-chloro-saligenin.

7. The process of claim 1 wherein providing said organic extractant is defined further as contacting an aqueous alkaline solution containing boron and sodium ions with an aromatic polyol to form said organic extractant comprising said polyol-boron-alkali metal complex.

8. The process of claim 1 wherein providing said organic extractant is defined further as contacting an aqueous alkaline solution containing boron and alkali metal ions, at least a portion of said alkali metal ions comprising an alkali metal other than potassium, with an aromatic polyol to form said organic extractant comprising said polyol-boron-alkali metal complex.

* * * * *

UNITED STATES PATENT AND TRADEMARK OFFICE
CERTIFICATE OF CORRECTION

PATENT NO. : 4,261,961
DATED : April 14, 1981
INVENTOR(S) : Robert E. Davis

It is certified that error appears in the above-identified patent and that said Letters Patent are hereby corrected as shown below:

Column 1, line 35, "3,493,3493,582,290" should read -- 3,493,349; 3,582,290 -- line 43, "he" should read -- the --

Column 2, line 1, "4-nonyl-6chloro-saligenin" should read -- 4-nonyl-6-chloro-saligenin -- line 40, "conained" should read -- contained --

Column 3, line 4, "solutin" should read -- solution -- line 31, "ration" should read -- ratio --

Column 4, line 23, "teste" should read -- tests -- line 55, "phenolic" should read -- phenolics --

Column 6, line 1, "whrein" should read -- wherein -- line 15, "claim wherein" should read -- claim 1 wherein --

Signed and Sealed this

Fourteenth Day of July 1981

[SEAL]

Attest:

GERALD J. MOSSINGHOFF

Attesting Officer   Commissioner of Patents and Trademarks